No. 853,241. PATENTED MAY 14, 1907.
H. HELBERGER.
STEP-BY-STEP ELECTRIC SEAM WELDING APPARATUS.
APPLICATION FILED SEPT. 19, 1906.
2 SHEETS—SHEET 1.
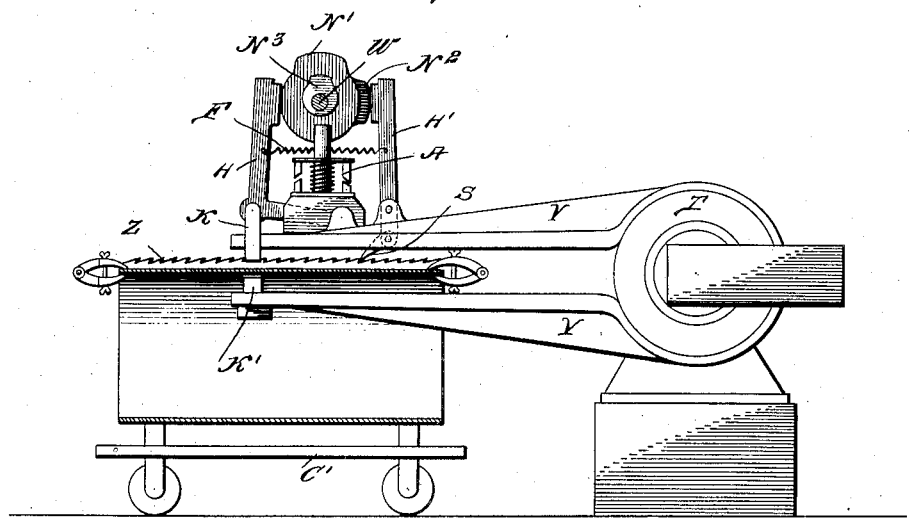
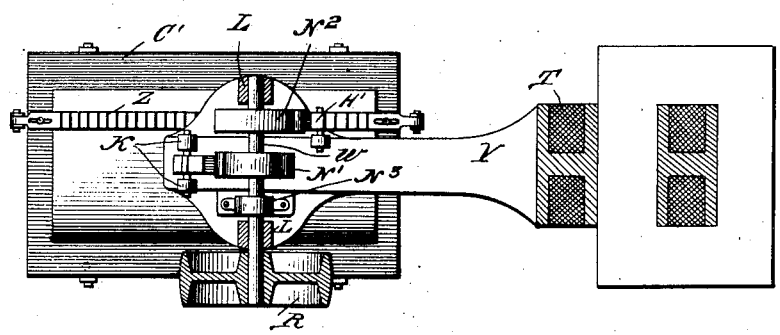
Witnesses
B. M. Offutt
Thomas Durant
Inventor
Hugo Helberger
By Church & Church
his Attorneys No. 853,241. PATENTED MAY 14, 1907.
H. HELBERGER.
STEP-BY-STEP ELECTRIC SEAM WELDING APPARATUS.
APPLICATION FILED SEPT. 19, 1906.

2 SHEETS—SHEET 2.

Witnesses
Inventor
Hugo Helberger,
By Church & Church
his Attorneys

UNITED STATES PATENT OFFICE.

HUGO HELBERGER, OF MUNICH, GERMANY.

STEP-BY-STEP ELECTRIC SEAM-WELDING APPARATUS.

No. 853,241. Specification of Letters Patent. Patented May 14, 1907.

Application filed September 19, 1906. Serial No. 335,273.

*To all whom it may concern:*

Be it known that I, HUGO HELBERGER, a subject of the Emperor of Germany, residing at Munich, Germany, have invented a certain new and useful Improved Step-by-Step Electric Seam-Welding Apparatus; and I do hereby declare the following to be a full, clear, and exact description of the same, reference being had to the accompanying drawings, forming a part of this specification, and to the figures and letters of reference marked thereon.

This invention relates to electric welding machines the objects of the invention being to provide a means whereby longitudinal welded seams or unions may be made in a rapid thorough and economical manner, to which ends the invention consists in a means whereby the seam or union is formed by a succession of welds which may be spaced apart after the manner of rivets or may overlap or join to form continuous welds.

The invention further consists in certain novel details of construction and combinations and arrangements of the mechanism constituting the machine all as will be now described and pointed out particularly in the appended claims.

Figure 3:
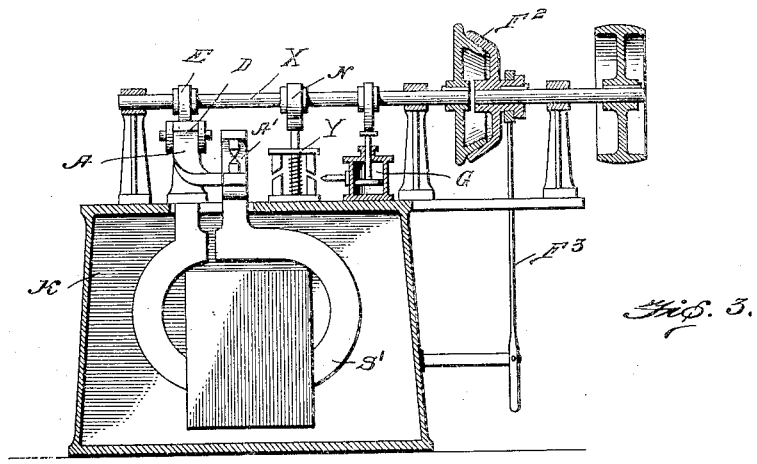
Figure 4:
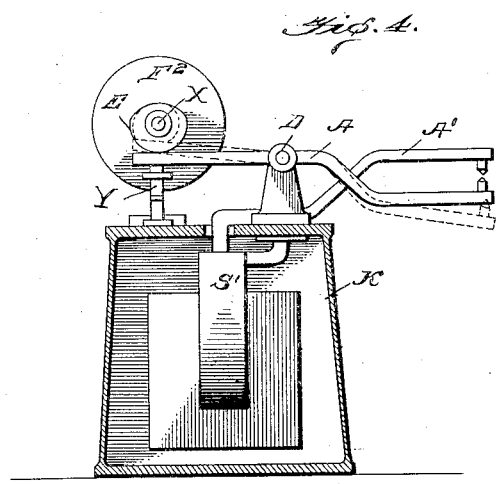

In the accompanying drawings—Figure 1 is a side elevation partly in section of a machine for carrying the present invention into practice. Fig. 2 is a top plan view partly in section of the machine shown in Fig. 1. Fig. 3 is an elevation partly in section of a modified form of machine designed particularly for forming seams of small articles or light sheet metal. Fig. 4 is an elevation partly in section taken in a plane at right angles to Fig. 3.

Similar letters of reference in the several figures indicate like parts.

The apparatus illustrated embodies a welding transformer T Fig. 1, of known construction adapted to convert high potential current into current of lower potential and great amperage. Substantially rigid pole extensions V V extend in substantial parallelism from the transformer in position to permit the work to pass between them and the contact pieces K and K' are mounted on said extensions or arms in position to contact with opposite sides of the work. One of the arms supports bearings L for an operating shaft W adapted to be rotated by a belt pulley R. Cam disks on the shaft R operate to periodically make and break the primary circuit, feed the work with relation to the contacts and where desired open and close the contacts on the work, thus the cam $N^3$ periodically closes the switch A; the cam $N^2$ periodically moves the feed lever H' and the cam N' through the lever H and spring F operates to reciprocate the contact piece K. Said parts are timed to operate in sequence thus the contacts are first closed on the work, then the switch is closed and again opened before the contacts separate and the feed lever is operated to feed the work when both the contacts and switch are open.

While it is preferred that the contacts shall be opened and closed periodically, it is obvious that they may rest against the work at all times and have the work drawn between them, the movement away from each other only releasing the work sufficiently to permit the feed to take place. This is advantageous in that the electrodes are polished by contact with the work and when heavy clamping action is not desired the mechanism for moving the contacts apart may be dispensed with.

Various arrangements whereby the work and transformer may be fed or moved with relation to each other may be employed, a simple arrangement being shown by way of illustration. In the arrangement illustrated, the work, a sheet metal cylinder or pipe the overlapping or abutting edges of which are to be united, is mounted on a carriage C' and a rack bar Z adapted to be engaged by a pawl or dog S on the lever H' is connected with the carriage, whereby when the lever is reciprocated the work is given a step by step feed. The particular manner of mounting the rack bar is not material, thus it may be connected with the carriage through the work itself to which the rack bar is clamped by hand clamps z, but it will be understood that any well known intermittent feed mechanism may be employed, the particular feature of the present invention being the step by step welding of a seam without regard to the particular mechanism and regardless of whether the work or the contacts or both are moved in securing the desired relative feed movement of the contacts and work.

In operation, the overlapped or abutted edges of the sheet metal are inserted between the contacts K, K' and by them pressed firmly together. Rotation of the shaft establishes the circuit and a current shock passes from one contact to the other through the work effecting the welding at that point. The current continues while the switch is closed and its duration may be regulated by the use of cams having different peripheral length but it is interrupted by the opening of the switch prior to the feed movement and where the contacts open, prior to the opening of the contacts.

Obviously, the feed may be of such length that the points of welding are spaced apart and may well form an effective substitute for rivets or the feed may be short and the welding areas overlapped to form a continuous weld or seam which is tight throughout.

In Figs. 3 and 4 an arrangement is shown wherein the transformer S' is located in a casing or housing K and the polar arms or extensions A, A' pass out of the casing, one A' being rigid and the other A jointed at D whereby it may be moved about a fixed axis. Oscillatory movement is imparted by the eccentric disk E engaging the rear end of the pivoted part of the arm A. The shaft X carrying the cam disk E is in this instance also provided with a cam disk N for actuating the switch Y for the primary of the transformer and the adjustments are such that the current is established when the contacts on the arms are pressed toward each other and the current is interrupted before the arms separate.

A worm feed mechanism such as in Figs. 1 and 2 may be employed or when the seam is small or curved manual feed may be resorted to. For convenience in starting and stopping the machine a friction clutch F² is provided, adapted to be operated by a treadle lever F³.

If an electric arc forms in the switch the weld is not as effective as when the current is interrupted quickly and at the proper instant and hence it is desirable to employ means for preventing such arcing. The desired result may be secured by employing a spark or arc extinguisher consisting of a blower G which creates a strong air current across the switch points at the moment of their separation. The blower may as shown be operated from the main shaft and the result is a precise interruption of the current giving the most effective results.

Having thus described my invention, what I claim and desire to secure by Letters Patent, is:—

1. An apparatus for electrically welding seams to unite edges of sheets of metal, embodying electrodes having contact faces forming positive and negative electrodes respectively in opposition to each other, and, movable toward and from each other to clamp or release the work between said contact faces, means for moving said electrodes toward and from each other periodically and means for establishing the circuit through said electrodes when the work is clamped between them, said means being adapted to break the circuit before the work is released and to only establish the same after the work is clamped between the electrodes.

2. An electric step by step seam welding apparatus embodying electrodes having proximate work contacting faces located opposite to each other and forming positive and negative electrodes respectively movable toward and from each other and between which the work is fed and clamped intermittently and a periodically acting switch timed to interrupt the current while the electrodes are separated.

3. An electric step by step seam welding apparatus embodying electrodes having proximate work contacting faces located opposite to each other and forming positive and negative electrodes respectively, means for moving said electrodes toward and from each other and an intermittent work feeding mechanism timed to feed the work between the electrodes when the electrodes are moved away from each other.

4. An electric step by step seam welding apparatus embodying electrodes having proximate work contacting faces located opposite each other and forming positive and negative electrodes respectively, means for periodically moving said electrodes toward and from each other to clamp the work between said faces, an intermittent work feeding mechanism timed to feed the work between the electrodes when the electrodes are moved away from each other and an intermittently operating switch timed to establish the circuit and permit a welding current to flow only when the electrodes are pressed toward each other.

5. An electric welding apparatus embodying work feeding mechanism, contacts having work contacting faces located opposite to each other and coöperating with opposite sides of the work being fed both during the welding and during the feed movements of the work whereby the electrodes are polished but movable toward and from each other to clamp or release the work and an intermittently operating switch timed to interrupt the current during the feed movements of the work.

HUGO HELBERGER.

Witnesses:—
  LOUIS MUELLE,
  ULYSSES J. BYWATER.